United States Patent
Ly-Gagnon

(10) Patent No.: US 8,885,692 B2
(45) Date of Patent: *Nov. 11, 2014

(54) ESTIMATION OF INTENTIONAL PHASE SHIFT IN A CALIBRATION APPARATUS

(71) Applicant: QUALCOMM Incorporated, San Diego, CA (US)

(72) Inventor: Yann Ly-Gagnon, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 13/734,899

(22) Filed: Jan. 4, 2013

(65) Prior Publication Data

US 2013/0121389 A1    May 16, 2013

Related U.S. Application Data

(63) Continuation of application No. 12/985,201, filed on Jan. 5, 2011, now Pat. No. 8,351,492.

(51) Int. Cl.
*H04B 1/38*    (2006.01)
*H04L 5/16*    (2006.01)
(Continued)

(52) U.S. Cl.
CPC .............. *H04B 1/62* (2013.01); *H04L 27/364* (2013.01); *H04L 2027/0022* (2013.01);
(Continued)

(58) Field of Classification Search
CPC ... H04L 27/2601; H04L 1/0025; H04L 1/243; H04L 1/0001; H04L 1/0009; H04L 1/1854; H04L 25/4927; H04L 5/1438; H04L 27/2608; H04L 27/01; H04L 25/03038; H04L 2025/0324; H04L 27/38; H04L 27/34; H04L 27/3488; H04L 1/0041; H04L 1/0071; H04L 27/368; H04L 25/03343; H04B 1/40; H04B 3/23; H04B 1/403; H04B 1/0003; H04B 1/406; H04B 1/50; H04B 1/408; H04B 1/405; H04B 1/3805; H04B 1/3877; H04B 1/16; H04B 1/128; H03D 3/008; H03D 3/009; H03F 1/3247; H03F 1/3294; H03F 2201/32333; H04M 1/72

USPC ................. 375/221, 296, 235, 219, 222, 261; 455/88, 86, 84

See application file for complete search history.

(56) References Cited

U.S. PATENT DOCUMENTS 7,181,205 B1    2/2007   Scott et al.
(Continued)

FOREIGN PATENT DOCUMENTS

WO    2009147891 A1    12/2009

OTHER PUBLICATIONS

Behzad, et al., "A Fully Integrated MIMO Multiband Direct Conversion CMOS Transceiver for WLAN Applications (802.11n)", IEEE Journal of Solid-State Circuits, vol. 42, No. 12, Dec. 2007, pp. 2795-2808.
(Continued)

*Primary Examiner* — Phuong Phu
(74) *Attorney, Agent, or Firm* — Holland & Hart LLP

(57) ABSTRACT

Embodiments of the present invention provide an apparatus comprising a transceiver having a receiver and a transmitter connected through a segment of a calibration loop back path. The apparatus also comprises a control system configured to communicate with the transceiver. The calibration loop back path has an intentional phase shift that can be toggled between an off state and an on state by the control system. The control system is configured to calculate the intentional phase shift by examining the difference of a first and second phase angle. The first phase angle is obtained from the transmission of a first pair of signals with the intentional phase shift in the off state. The second phase angle is obtained from the transmission of a second pair of signals with the intentional phase shift in the on state.

19 Claims, 5 Drawing Sheets

(51) Int. Cl.
*H04L 27/36* (2006.01)
*H04L 27/38* (2006.01)
*H04B 1/62* (2006.01)
*H04L 27/00* (2006.01)

(52) U.S. Cl.
CPC ..... *H04L 2027/0016* (2013.01); *H04L 27/3854* (2013.01)
USPC ........... 375/221; 375/296; 375/235; 375/219; 375/222; 375/261; 455/88; 455/86; 455/84

(56) References Cited

U.S. PATENT DOCUMENTS

| | | | |
|---|---|---|---|
| 8,050,350 B2 | 11/2011 | Ahirwar et al. | |
| 8,295,845 B1* | 10/2012 | Abdollahi-Alibeik et al. | 455/445 |
| 8,351,492 B2* | 1/2013 | Ly-Gagnon | 375/221 |
| 8,681,896 B1* | 3/2014 | Chen et al. | 375/296 |
| 2007/0189371 A1 | 8/2007 | Yen | |
| 2008/0166985 A1 | 7/2008 | Wortel et al. | |
| 2009/0042521 A1 | 2/2009 | Otaka et al. | |
| 2010/0297966 A1* | 11/2010 | Row et al. | 455/114.3 |
| 2010/0327932 A1* | 12/2010 | Aparin et al. | 327/254 |
| 2011/0075715 A1 | 3/2011 | Kravitz | |
| 2011/0292978 A1 | 12/2011 | Kravitz | |

OTHER PUBLICATIONS

Behzad, et al., "A Fully Integrated MIMO Multi-Band Direct-Conversion CMOS Transceiver for WLAN Applications (802.11n)", IEEE International Solid-State Circuits Conference, 2007, 3pgs.
Behzad, "Wireless LAN Radios System Definition to Transistor Design", IEEE Press, 2007, 249pgs.
Bouras, et al., "A Digitally Calibrated 5.15-5.825GHz Transceiver for 802.11a Wireless LANs in 0.18 µm CMOS", IEEE International Solid-State Circuits Conference, 2003, 10pgs.
Bouras, et al.: "A Single-Chip Digitally Calibrated 5.15-5.825-GHz 0.18-µm CMOS Transceiver for 802.11a Wireless LAN" IEEE Journal of Solid-State Circuits, IEEE Service Center, Piscataway, NJ, US, vol. 38, No. 12, Dec. 1, 2003, pp. 2221-2231, XP011104335 ISSN: 0018-9200.
International Search Report and Written Opinion—PCT/US2011/067666—ISA/EPO—Apr. 20, 2012.

* cited by examiner

ESTIMATION OF INTENTIONAL PHASE SHIFT IN A CALIBRATION APPARATUS

RELATED APPLICATIONS

This application is a continuation of U.S. patent application Ser. No. 12/985,201, entitled "ESTIMATION OF INTENTIONAL PHASE SHIFT IN A CALIBRATION APPARATUS" filed Jan. 5, 2011.

FIELD OF THE INVENTION

This invention relates to radio transceivers, and more specifically to methods and systems for calibrating radio transceivers.

BACKGROUND OF THE INVENTION

At the turn of the 20th century the airwaves of the United States were completely silent. Today they are filled to the brim with wireless communication signals. The recent history of wireless telegraphy is characterized by a concerted push towards fitting more and more information into the air. Complex modulation schemes have been developed that package information with increasing efficiency. To match this ever increasing degree of efficiency radios are required to resolve these signals with a commensurate degree of precision. Precision is required because wireless signals are corrupted by noise as they are sent through a wireless medium and because as more complex patterns are used to represent information it becomes more challenging to determine one pattern from another.

Modulation schemes such as Gaussian frequency shift keying (GFSK), Phase shift keying (PSK), and Quadrature amplitude modulation (QAM) can utilize two channels that transmit signals that are 90° out of phase with each other. The two channels are called the i-channel and the q-channel. These channels carry the in-phase and quadrature-phase signal respectively. The signal to be transmitted is mixed with an in-phase local oscillator and a quadrature-phase local oscillator to form the modulated signals at a frequency that is amenable to transmission through the air. Due to the principles of linearity, the two signals can be sent through the air simultaneously and then the received signal can be resolved at the receiver into the original component parts. This modulation scheme results in a highly efficient usage of available bandwidth.

Although I/Q channel modulation has certain benefits regarding the amount of bandwidth consumed, the increased complexity of the modulation scheme can result in several errors that make resolving the signal difficult. Like other wireless systems, I/Q channel modulated signals can suffer from carrier leak. In order to effectively transmit and resolve a signal that has been mixed with a local oscillator signal the transmitter and receiver must agree on what frequency the signal was mixed with. If the two disagree on this frequency the receiver will mistakenly interpret a portion of the mixed frequency as the information signal. This phenomenon is called carrier leak. In addition, I/Q channel modulated signals are susceptible to a group of errors that can collectively be referred to as IQ imbalance errors. I/Q channel modulation requires the receiver and transmitter to agree not only on what the carrier frequency is, but also on what the phase difference of the two signals are. If the transmitter does not impart the right amount of phase shift, or the receiver resolves the signals as if they had a different phase shift, this mismatch will also bleed into the signal itself and will show up as an error in the signal. The combined results of these errors can be broken up and expressed as four quantities; the phase error of the transmitter ($\Delta\theta_T$), the phase error of the receiver ($\Delta\theta_R$), the amplitude error of the transmitter normalized to nominal gain ($\epsilon_T$), and the amplitude error of the receiver normalized to nominal gain ($\epsilon_R$). The quantities can be collectively referred to as the IQ imbalance error metrics of the transceiver.

Since manufacturing processes are not perfect, the errors described in the previous paragraph will be different from part to part. This means that two parts that come off of the assembly line one after the other may have manufacturing imperfections that result in highly variant error metrics. Therefore, a designer cannot design out these error sources and produce a design that will always work. Instead, wireless radios need to be designed such that they can be individually calibrated to remove these errors.

SUMMARY OF INVENTION

In one embodiment of the invention, an apparatus is provided. The apparatus comprises a transceiver having a receiver and a transmitter connected through a segment of a calibration loop back path. The apparatus also comprises a control system configured to communicate with the transceiver. The calibration loop back path has an intentional phase shift that can be toggled between an off-state and an on-state by the control system. The control system is configured to calculate the intentional phase shift by examining the difference of a first and second phase angle. The first phase angle is obtained from a first transmission of a first pair of signals with the intentional phase shift in the off-state. The second phase angle is obtained from a second transmission of a second pair of signals with the intentional phase shift in the on-state.

In another embodiment of the invention, a method for estimating the intentional phase shift of a calibration loop back path is provided. In one step a first and second signal are transmitted on a single channel of a transmitter along a segment of the calibration loop back path. The calibration loop back path connects the transmitter to a receiver and has an intentional phase shift. In another step, the first and second signals are received with said receiver through the segment of the calibration loop back path to obtain a quantum of information. In another step, a first phase angle is determined based on a quantum of information. In another step, the intentional phase shift is activated. In another step, the third and fourth signal are transmitted on the single channel of the transmitter along the segment of the calibration loop back path. In another step, a third and fourth signals are received with the receiver through the segment of the calibration loop back path to obtain a second quantum of information. In another step a second phase angle is determined base on the second quantum of information. In another step, the intentional phase shift is calculated based on the first and second phase angles to obtain an estimated value of the intentional phase shift.

In another embodiment of the invention, a system is provided. The system comprises a transceiver having a receiver and a transmitter connected through a segment of a calibration loop back path. The system also comprises a control system configured to communicate with the transceiver. The system also comprises an IQ mismatch calibration unit that is within the control system, and a transmitter pre-distortion unit that is also within the control system. The transmitter pre-distortion unit is configured to provide a pre-distortion compensation. The calibration loop back path has an intentional phase shift that can be toggled between an off-state and an on-state by the control system. The control system is configured to calculate the intentional phase shift by examining the difference of a first and second phase angle. The first phase angle is obtained from the transmission of a first pair of signals with the intentional phase shift in the off-state. The second phase angle is obtained from the transmission of a second pair of signals with the intentional phase shift in the on-state. The IQ mismatch calibration unit calculated the pre-distortion compensation based on a set of measurements obtained using the intentional phase shift.

DETAILED DESCRIPTION OF THE PREFERRED EMBODIMENTS

Figure 1:
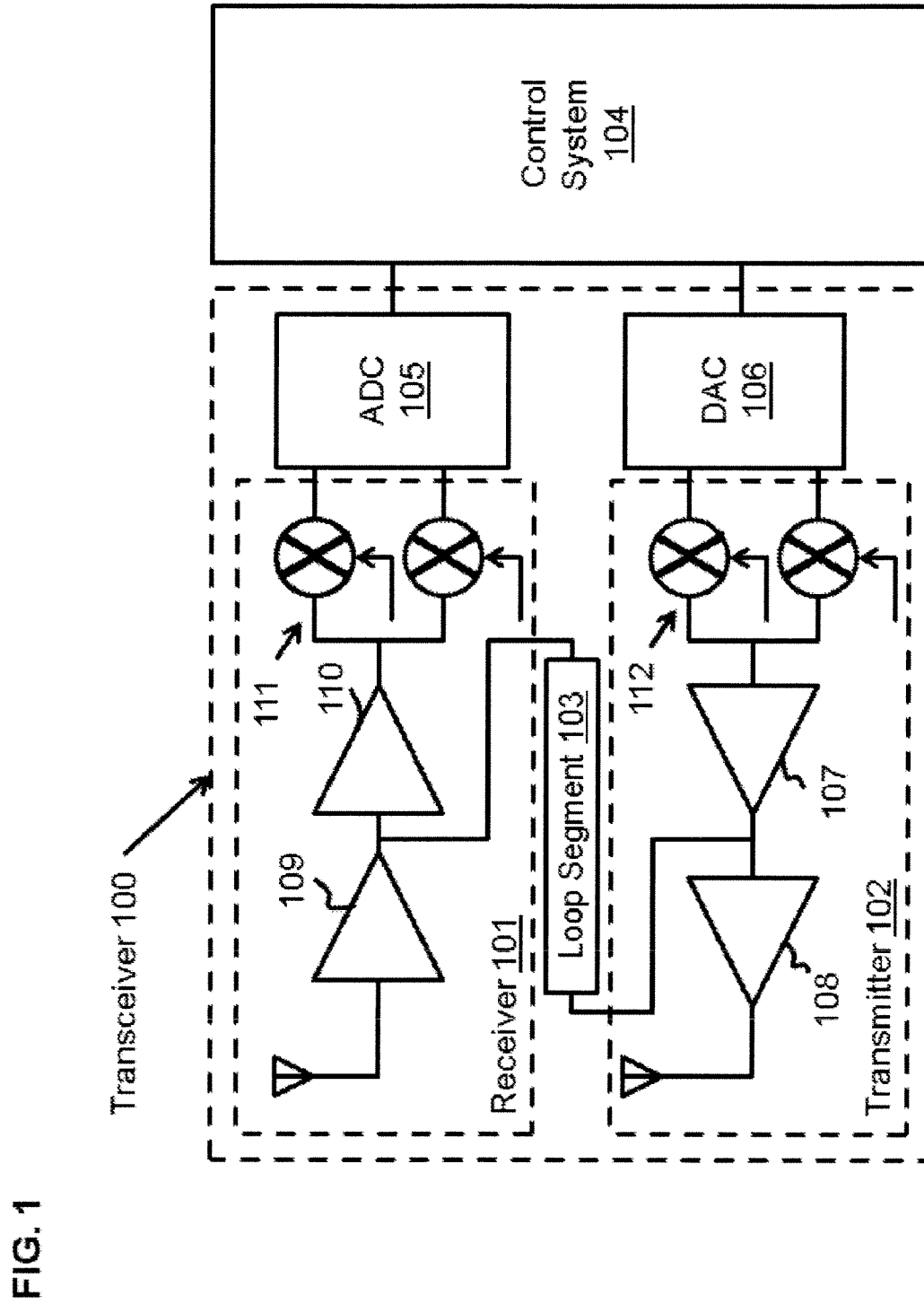
FIG. 1 illustrates a block diagram of an apparatus that is in accordance with the present invention.

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be include within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

A specific embodiment of the invention can be described with reference to FIG. 1. FIG. 1 illustrates a transceiver 100 having a receiver 101 and a transmitter 102 connected through segment of a calibration loop back path 103. The entire calibration loop to which segment 103 is a part extends from control system 104, into transmitter 102, then into receiver 101, and then back into control system 104. Control system 104 can communicate with transceiver 100 through analog-to-digital converter (ADC) 105 connected to receiver 101 and digital-to-analog converter (DAC) 106 connected to transmitter 102. Segment 103 is shown connecting the intersection of variable gain amplifier 107 and power amplifier 108 with the intersection of low noise amplifier 109 and variable gain amplifier 110. However, segment 103 can comprises any part of any calibration loop described above. For example, segment 103 can comprises a portion of a feedback loop that directly links mixer pairs 111 and 112. The calibration loop is activated during a calibration phase of the circuit and has an intentional phase shift that can be toggled between an off-state and an on-state by control system 104. In specific embodiments of the invention, transceiver 100 will utilize QAM. In these embodiments mixer pairs 111 and 112 will mix in and demodulate the local frequency to the information signal using both an in-phase and quadrature carrier frequency signal. Mixer pairs 111 and 112 may be connected to ADCs and DACs that are physically separate circuits.

The intentional phase shift of the loop back path illustrated in FIG. 1 can be used to calibrate transceiver 100. A process for executing this calibration is described in U.S. patent application Ser. No. 12/328,128 filed on Dec. 4, 2008 to Alibeik et al which is incorporated by reference as if set for herein in its entirety. The process involves sending two sets of signals from transmitter 102 to receiver 101 along loop segment 103. The first set of signals is sent with the intentional phase shift in the off-state and the second set of signals is sent with the intentional phase shift in the on-state. By resolving these two sets of signals it is possible to calculate all four of the IQ imbalance error metrics $\Delta\theta_T$, $\Delta\theta_R$, $\epsilon_T$, and $\epsilon_R$. Once these values are known, their effects can be calibrated out by control system 104. Control system 104 will be able to calculate a compensation signal to add to any information signal it sends with transmitter 102 to eliminate IQ imbalance errors from the transmitted signal. In addition, control system 104 will be able to resolve signals it receives with receiver 101 in accordance with a compensation scheme to eliminate IQ imbalance errors from the received signal. The calculation conducted by control system 104 that solves for the IQ imbalance error metrics is dependent upon the intentional phase shift. As described in the above referenced application this value is treated as a constant.

Figure 2:
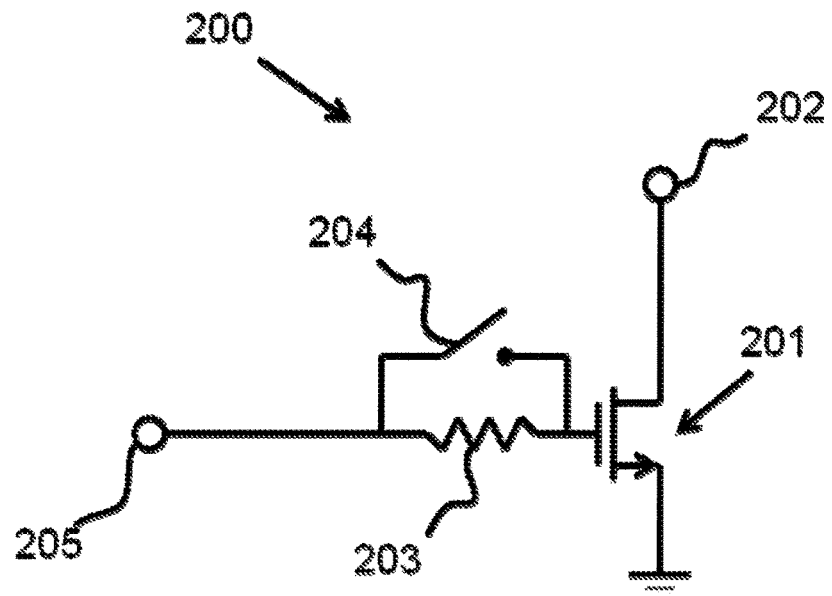
FIG. 2 illustrates a block diagram of a phase shift unit that can be used in accordance with the present invention.

The process described in the previous paragraph is an efficient process for determining the IQ imbalance errors of transceiver 100 with minimal measurements. However, the process depends on the intentional phase shift being a known value and which is not necessarily true. The intentional phase shift is not easy to discern and does not always equal the expected value. Just as the IQ imbalance errors are variable, the intentional phase shift changes from part to part. Therefore, the intentional phase shift should be measured before the IQ imbalance calibration is carried out. Once the intentional phase shift is measured it can be used as a constant in the IQ imbalance calibration. FIG. 2 illustrates a phase shift generator that can be used in place of loop segment 103. FIG. 2 illustrates circuit 200 that can be used in accordance with the present invention to introduce a phase shift in the loop back path. The embodiments to which this configuration is in accordance generate the intentional phase shift in loop segment 103, but in other embodiments of the invention the intentional phase shift is generated elsewhere in the calibration loop. Transistor 201 has its source connected to ground and its drain connected to node 202. Node 202 connects to the receiver. Transistor 201 has its gate connected to resistor 203 and switch 204. Node 205 connects to the transmitter. Circuit 200 is switched between the on-state and off-state by changing the state of switch 204. By properly selecting resistor 203, circuit 200 can add a desired phase shift to the loop back path. In specific embodiments of the invention this phase shift will be 90°. As mentioned previously, the intentional phase shift introduced by circuits such as circuit 200 is very important for the loop back method calculation of the IQ imbalance errors. However, the phase shift introduced by circuit 200 will depend on the actual resistance of resistor 203 and the characteristics of transistor 201. Since the value of the intentional phase shift will vary from part to part it must be measured before the loop back method is executed to calculate the IQ imbalance errors.

Specific embodiments of the present invention are able to calculate the intentional phase shift of the loop back path of transceivers such as transceiver 100. In specific embodiments of the invention, control system 104 is configured to calculate the intentional phase shift of the loop back path by examining the difference of a first and second phase angle. The first phase angle is obtained from the transmission of a first pair of signals through the loop back path with the intentional phase shift unit in the off-state. The second phase angle is obtained from the transmission of a second pair of signals through the loop back path with the intentional phase shift in the on-state. In specific embodiments of the invention the first and second pairs of signals are transmitted on the i-channel transmitter path of transmitter 102 and are received on the i-channel and q-channel receiver paths of receiver 101. In specific embodiments of the invention, the first and second pairs of signals are identical. In specific embodiments of the invention control system 104 will comprises a coordinate rotation digital computer (CORDIC) that is configured to receive a quantum of information regarding the first and second pairs of signals through ADC 105 and is configured to calculate the first and second phase angles based on that quantum of information. In specific embodiments of the invention control system 104 will be implemented in digital circuitry. In specific embodiments of the invention control system 104 will comprise or be partially comprised of software.

Figure 3:
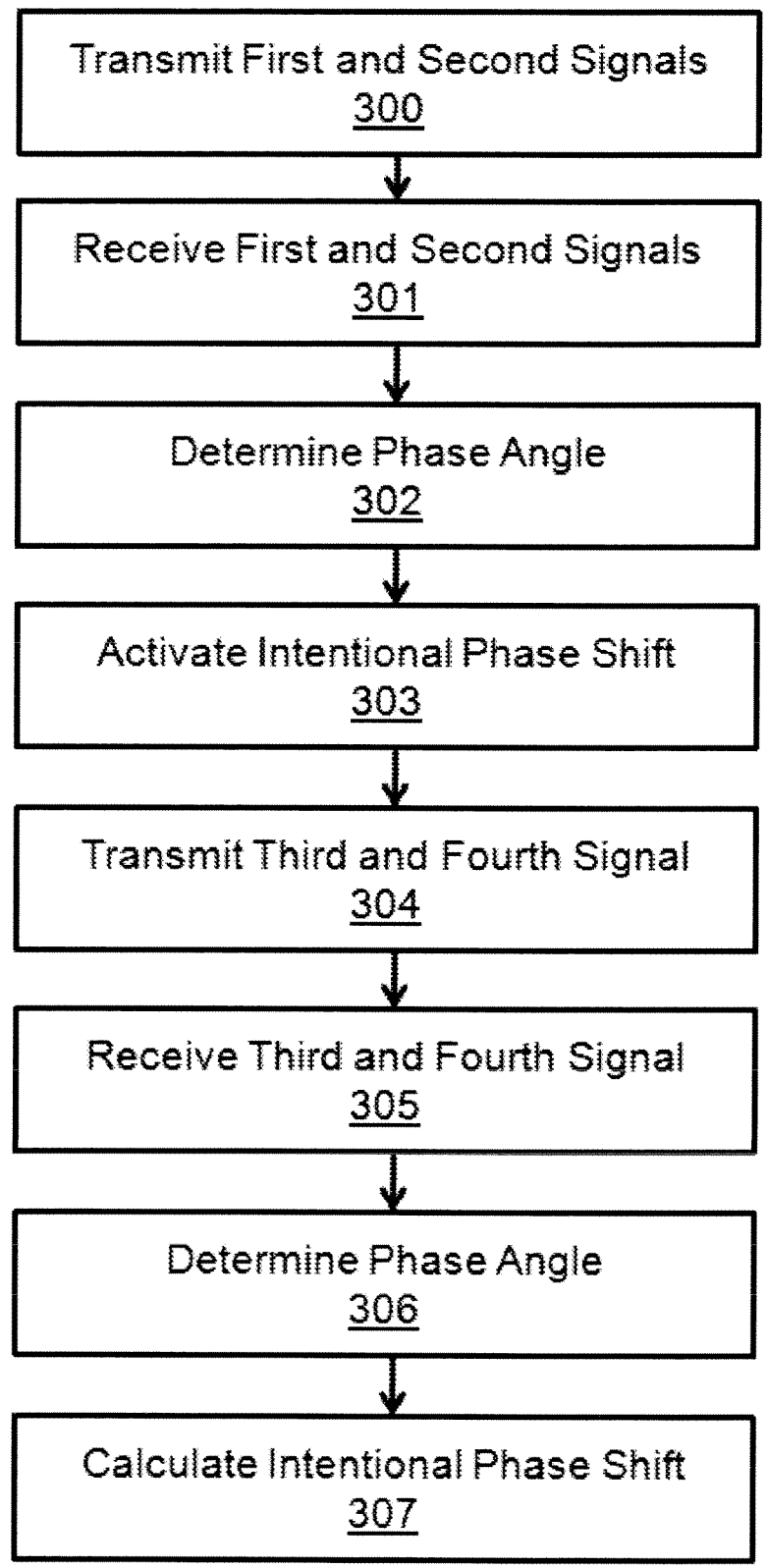
FIG. 3 illustrates a process flow chart of a method for determining the intentional phase shift of an apparatus that is in accordance with the present invention.

A specific embodiment of the invention can be described with reference to FIG. 3. FIG. 3 illustrates a method for estimating an intentional phase shift of an IQ calibration apparatus that is in accordance with the present invention. With reference to FIG. 1, this method can be used to calculate the intentional phase shift of the calibration loop in a transceiver such as transceiver 100. In step 300 a first and second signal are transmitted on a single channel of a transmitter along a segment of a calibration loop back path that connects the transmitter to the receiver. In step 301 the first and second signals are received by the receiver through the segment of the calibration loop back path and a quantum of information is obtained from the received signals. In step 302 a first phase angle is determined based on this quantum of information. In step 303 an intentional phase shift is activated. In specific embodiments of the invention the phase shift will be produced by a circuit such as circuit 200 shown in FIG. 2 and will be positioned as loop segment 103 in FIG. 1. In step 304 a third and fourth signal are transmitted on the same single channel of the transmitter along the same segment of the calibration loop back path. In step 305 the third and fourth signals are received through this segment of the calibration loop back path and a second quantum of information will be obtained from the received signals. In step 306 a second phase angle is determined based on the second quantum of information. In step 307 an estimate of the intentional phase shift is calculated based on the first and second phase angles.

In specific embodiments of the invention, the receiver and transmitter used in step 300, 301, 304, and 305 can be components of a single transceiver. In specific embodiments of the invention this transceiver is capable of functioning in accordance with a Bluetooth protocol. In specific embodiments of the invention, the method comprising steps 300-307 can be executed using a control system such as control system 104 described with reference to FIG. 1. For example, the steps of determining the first and second phase angles can be executed by a CORDIC that forms a portion of control system 104.

In specific embodiments of the invention, the method can additionally comprise the step of checking the magnitude of the average value of the first, second, third, and fourth signals at the receiver against a saturation protection threshold. The information obtained in this step can be used to readjust the measurement and calibration algorithm so that the receiver is not saturated and the calibration signals are not resolved incorrectly by the receiver. In specific embodiments of the invention if the saturation protection threshold is exceeded the receiver baseband gain will be reduced. For example, the receiver baseband gain may be reduced by 6 dB. As a result it is possible for every transmission gain to be calibrated while keeping the signal at the ADC the same.

In specific embodiments of the invention, the method can additionally comprise the step of cancelling the DC offset of the receiver. This step could precede step 300 and could improve the accuracy of the determining steps 302 and 306. This step would be most useful when the receiver was uncalibrated. If the receiver was designed to be extremely precise or was calibrated through other means this step would not be necessary.

In specific embodiments of the invention, the receiving and transmitting in steps 300, 301, 304, and 305 can be executed in accordance with a Bluetooth protocol. Modulation can be conducted using GFSK, PSK, QAM, or any other digital modulation scheme. The transmitter used for transmitting could comprise an i-channel transmitter path and a q-channel transmitter path. The receiver could comprise an i-channel receiver path and a q-channel receiver path. The operation of steps 300 and 301 and steps 304 and 305 that are in accordance with these embodiments can be described with reference to FIG. 4.

Figure 4:
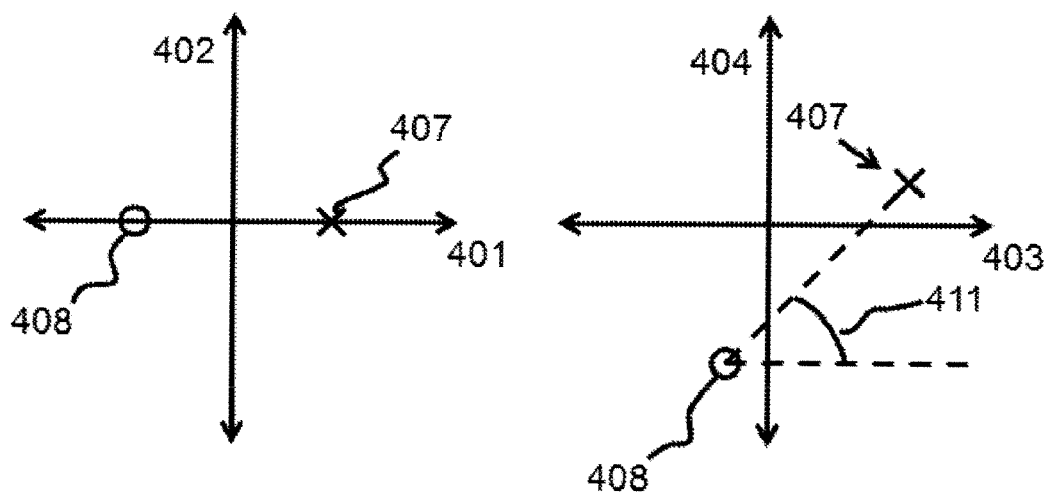
FIG. 4 illustrates signals transmitted and received using I/Q channel modulation during a process that is in accordance with the present invention.
Figure 4:
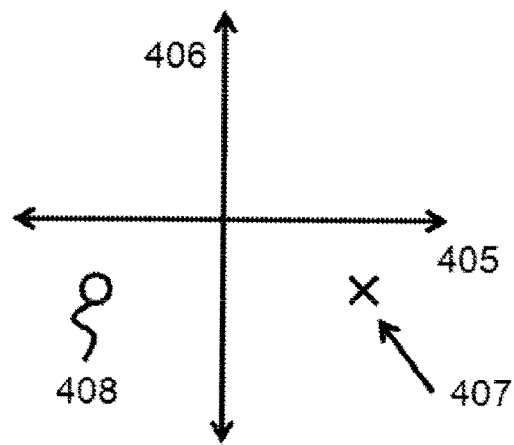

FIG. 4 displays three sets of axes 402 and 401, 404 and 403, and 405 and 406. Axis 401 illustrates the magnitude of a signal sent on the i-channel of a transmitter. Axis 402 illustrates the magnitude of a signal sent on the q-channel of a transmitter. Therefore, signal 407 is sent solely on the i-channel and has a magnitude that is equal but opposite in sign to that of signal 408. As such, signal 407 could be the first signal transmitted in step 300 where the signal is transmitted only on the i-channel transmitter path and not on the q-channel. Likewise, signal 408 could be the second signal transmitted in step 300 in a similar fashion but with opposite magnitude. Axes 403 and 405 both illustrate the magnitude of a signal received on the i-channel of a receiver. Axes 404 and 406 both illustrate the magnitude of a signal received on the q-channel of a receiver.

FIG. 4 illustrates how IQ imbalances can result in the alteration of a signal from the transmitter to the receiver. On axis 401 and 402 it is shown how signal 407 is sent only on the i-channel. However, on axis 403 and 404 it is shown how signal 407 is received partially on the i-channel and partially on the q-channel. The phase angle 411 can be determined by control circuitry in step 302 and 306. If the intentional phase shift is activated and the same signals are resent such that the first and third signals and the second and fourth signals are identical the only difference in phase angle 411 will result from the addition of the intentional phase shift. Therefore subtracting the phase angle 411 obtained in step 302 from the phase angle 411 obtained in step 306 will produce an estimate of the intentional phase shift.

In specific embodiments of the invention the process described above with reference to FIGS. 3 and 4 can be executed by circuitry that serves another purpose such that the method can be executed with very little special purpose control circuitry or software. The control circuitry that determines phase angle 411 can also be used to rotate signal 407 and signal 408 about the origin by the phase angle 411. This process is used to determine the carrier leak because the inherent DC offset of the transceiver can be measured by comparing the relative position of signals 407 and 408 on axes 402 and 401 with their resultant positions on axes 405 and 406. Since the circuitry involved with these measurements serves a dual purpose the intentional phase shift can be measured with a minimal increase in the overall system's complexity.

Figure 5:
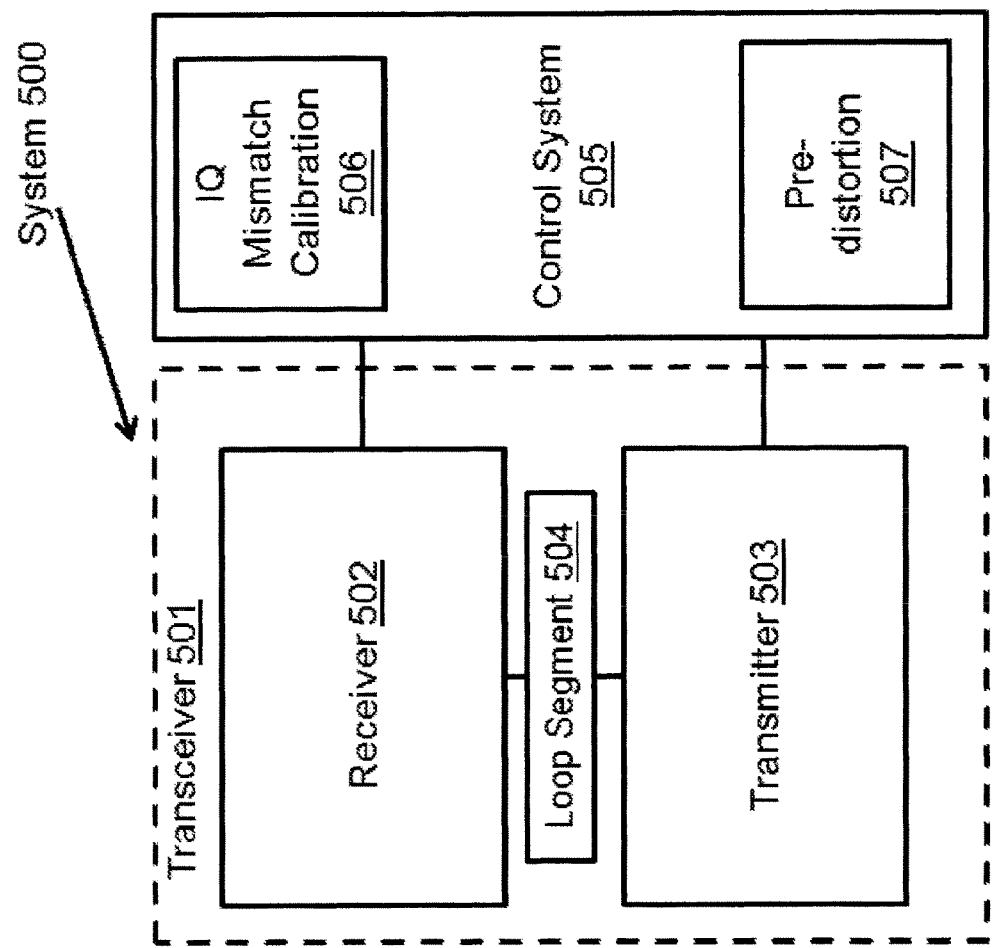
FIG. 5 illustrates a block diagram of a system that is in accordance with the present invention.

A specific embodiment of the invention can be described with reference to FIG. 5. Figure illustrates a system 500 that is in accordance with the present invention. System 500 comprises a transceiver 501 having a receiver 502 and a transmitter 503 that are connected through a segment of a calibration loop back path 504. In specific embodiments of the invention transceiver 501 will operate in accordance with a Bluetooth protocol. System 500 additionally comprises a control system 505 that is configured to communicate with transceiver 501. Control system 505 can comprise digital circuitry. In specific embodiments of the invention, control system 505 will comprise or be partially comprised of software. In specific embodiments of the invention control system 505 is comprised of a CORDIC. System 500 additionally comprises an IQ mismatch calibration unit 506 that is within control system 505. System 500 also comprises a transmitter pre-distortion unit 507 within control system 505 that is configured to provide a pre-distortion compensation to signals that are to be sent by transmitter 503. The calibration loop back path to which loop segment 504 belongs has an intentional phase shift that can be toggled between an off-state and an on-state by control system 505. Control system 505 is configured to estimate this intentional phase by executing a method that is in accordance with FIG. 3. In specific embodiments of the invention IQ mismatch calibration unit 506 will then calculate the pre-distortion compensation to be provided by pre-distortion unit 507 based in part on the intentional phase shift estimate obtained by control system 505.

In specific embodiments of the invention, system 500 will suffer from various analog impairments that affect receiver 502 and additionally or alternatively affect transmitter 503. These analog impairments can include phase noise, IQ imbalance impairments, and carrier leak impairments. These analog impairments can be compensated by pre-distortion unit 507. In specific embodiments of the invention, pre-distortion unit 507 will compensate for these impairments by digitally processing the signal to be sent by transmitter 503. In specific embodiments of the invention, pre-distortion unit 507 is able to compensate for these impairments through the use of IQ mismatch calibration unit 506, the execution of methods consistent with FIG. 3, and the intentional phase shift on the calibration loop.

The present invention can operate in accordance with a wireless communication system. A wireless communication system may comprise a plurality of communication devices, such as a personal computer (PC), a portable device, a WLAN access point, server, and a wireless portable communication device. In specific embodiments of the invention, the plurality of communication devices comprise a WLAN device including a transceiver, such as transceiver 100, that is configured to transmit and receive WLAN signals. In specific embodiments of the invention, the plurality of communication devices additionally comprise a PAN device including a transceiver, such as transceiver 100, that is configured to transmit and receive PAN signals.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention.

Nothing in the disclosure should indicate that the invention is limited to systems that functions with only a single transceiver or to two channel receiver/transmitter pairs. Nothing in the disclosure should limit the scope of the invention to electronics, communication through the use of charged particles or electro-magnetic waves, or communication through a wireless medium. Functions may be performed by hardware or software, as desired. In general, any diagrams presented are only intended to indicate one possible configuration, and many variations are possible. As used in the specification and in the appended claims the term "quantum of information" refers to a unit of information that can be in any form and size so long as it is comprises resolvable coherent information. Those skilled in the art will also appreciate that methods and systems consistent with the present invention are suitable for use in a wide range of applications encompassing any related to communications or information technology in general.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

The invention claimed is:

1. An apparatus comprising:
    a transceiver that includes a receiver, a transmitter and a calibration loop back path coupling the transmitter to the receiver, wherein the calibration loop back path has a first state and a second state, wherein no intentional phase shift is introduced to signals transmitted through the calibration loop back path in the first state, and wherein an intentional phase shift is introduced to signals transmitted through the calibration loop back path in the second state; and
    a control system coupled to the transceiver, wherein the control system is configured to identify the intentional phase shift by determining a difference between a first phase angle and a second phase angle, wherein the first phase angle is obtained in response to transmitting a first pair of signals from the transmitter to the receiver through the calibration loop back path while the calibration loop back path is configured in the first state, and the second phase angle is obtained in response to transmitting a second pair of signals from the transmitter to the receiver through the calibration loop back path while the calibration loop back path is configured in the second state.

2. The apparatus of claim 1, wherein the control system controls whether the calibration loop back path is configured in the first state or the second state.

3. The apparatus of claim 1, wherein the calibration loop back path is designed to introduce an intentional phase shift of 90 degrees to signals transmitted through the calibration loop back path in the second state.

4. The apparatus of claim 1, wherein the calibration loop back path is coupled between a first variable gain amplifier in the transmitter and a second variable gain amplifier in the receiver.

5. The apparatus of claim 1, wherein the calibration loop back path includes a resistor that introduces the intentional phase shift to signals transmitted through the calibration loop back path in the second state.

6. The apparatus of claim 1, wherein the control system includes a coordinate rotation digital computer (CORDIC) configured to receive a quantum of information associated with the first pair of signals transmitted through the calibration loop back path and the second pair of signals transmitted through the calibration loop back path, and determine the first phase angle and the second phase angle in response to the quantum of information.

7. The apparatus of claim 1, wherein the transceiver is configured to function in accordance with a Bluetooth protocol.

8. The apparatus of claim 1, wherein the transceiver further comprises:
    a digital-to-analog converter (DAC) coupling the control system to the transmitter; and
    an analog-to-digital converter (ADC) coupling the receiver to the control system.

9. The apparatus of claim 1, wherein the transmitter comprises an in-phase channel (i-channel) transmitter path, and the receiver comprises an i-channel receiver path and a quadrature-channel (q-channel) receiver path, wherein the control system configures the transceiver to transmit the first pair of signals and the second pair of signals through the i-channel transmitter path, to the calibration loop back path, to the i-channel receiver path and the q-channel receiver path.

10. The apparatus of claim 1, wherein the first pair of signals is identical to the second pair of signals.

11. The apparatus of claim 1, wherein the control system comprises:
    a transmitter pre-distortion unit that provides pre-distortion compensation to signals provided from the control system to the transmitter; and
    a calibration unit that determines the pre-distortion compensation in response to the identified intentional phase shift.

12. A method comprising:
    configuring a calibration loop back path to have a first state, wherein the calibration loop back path introduces no intentional phase shift in the first state;
    transmitting a first signal and a second signal from a transmitter to a receiver through the calibration loop back path while the calibration loop back path is in the first state, thereby providing a first quantum of information at the receiver;
    determining a first phase angle in response to the first quantum of information;
    configuring the calibration loop back path to have a second state, wherein the calibration loop back path introduces an intentional phase shift in the second state;
    transmitting a third signal and a fourth signal from the transmitter to the receiver through the calibration loop back path while the calibration loop back path is in the second state, thereby providing a second quantum of information at the receiver;
    determining a second phase angle in response to the second quantum of information; and
    identifying the intentional phase shift by determining a difference between the first phase angle and the second phase angle.

13. The method of claim 12, further comprising transmitting the first, second, third and fourth signals on a single channel within the transmitter.

14. The method of claim 13, further comprising receiving the first, second, third and fourth signals on a pair of channels within the receiver.

15. The method of claim 12, further comprising:
determining a magnitude of an average value of the first, second, third and fourth signals at the receiver;
comparing the magnitude of the average value with a threshold; and
reducing a gain of the receiver if the magnitude of the average value exceeds the threshold.

16. The method of claim 12, further comprising implementing a Gaussian frequency shift keying (GFSK) modulation scheme with the transmitter and the receiver.

17. The method of claim 12, wherein the first signal is identical to the third signal, and the second signal is identical to the fourth signal.

18. The method of claim 12, further comprising designing the calibration loop back path to introduce an intentional phase shift of 90 degrees to signals transmitted through the calibration loop back path in the second state.

19. An apparatus comprising:
a transceiver that includes a receiver, a transmitter and a calibration loop back path coupling the transmitter to the receiver;
means for configuring the calibration loop back path to have a first state and a second state, wherein no intentional phase shift is introduced to signals transmitted through the calibration loop back path in the first state, and wherein an intentional phase shift is introduced to signals transmitted through the calibration loop back path in the second state;
means for transmitting a first pair of signals from the transmitter to the receiver through the calibration loop back path while the calibration loop back path is in the first state, thereby providing a first quantum of information at the receiver;
means for determining a first phase angle in response to the first quantum of information;
means for transmitting a second pair of signals from the transmitter to the receiver through the calibration loop back path while the calibration loop back path is in the second state, thereby providing a second quantum of information at the receiver;
means for determining a second phase angle in response to the second quantum of information; and
means for identifying the intentional phase shift in response to the first phase angle and the second phase angle.

\* \* \* \* \*